(12) United States Patent
Ulveland

(10) Patent No.: US 6,215,993 B1
(45) Date of Patent: Apr. 10, 2001

(54) CALLER ID PREVIEW FOR MOBILE TELEPHONES

(75) Inventor: Stefan Ulveland, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/256,134

(22) Filed: Feb. 24, 1999

(51) Int. Cl.$^7$ .............................. H04M 3/42; H04B 1/38
(52) U.S. Cl. ......................... 455/415; 455/90; 455/567; 455/575
(58) Field of Search .......................... 455/90, 414, 415, 455/550, 567, 575, 566; 379/106.08, 433, 434, 437, 456

(56) References Cited

U.S. PATENT DOCUMENTS

| 5,175,759 | * | 12/1992 | Metroka et al. | 455/575 |
| 5,630,211 | * | 5/1997 | Nagai | 455/575 |
| 5,657,370 | * | 8/1997 | Tsugane et al. | 455/575 |
| 5,689,824 | * | 11/1997 | Nagai | 455/575 |
| 5,719,936 | * | 2/1998 | Hillenmayer | 455/575 |
| 5,857,157 | * | 1/1999 | Shindo | 455/550 |
| 5,884,185 | * | 3/1999 | Kim | 455/550 |
| 5,933,783 | * | 8/1999 | Kawakami et al. | 455/550 |
| 5,953,413 | | 9/1999 | Peyer et al. | |
| 6,018,671 | * | 3/2000 | Bremer | 455/567 |
| 6,094,565 | * | 7/2000 | Alberth et al. | 455/90 |

FOREIGN PATENT DOCUMENTS

| 19823882 | | 12/1998 | (DE) . |
| 19827833 | | 1/1999 | (DE) . |
| 0792054A2 | | 8/1997 | (EP) . |
| 2310568 | * | 8/1997 | (GB) . |
| WO 98/58482 | | 12/1998 | (WO) . |

* cited by examiner

Primary Examiner—Nay Maung
(74) Attorney, Agent, or Firm—Coats & Bennett, PLLC

(57) ABSTRACT

A mobile phone with a movable cover allows the user to preview caller ID information on a display that is normally concealed by the cover. In one embodiment, the user can open the cover to a preview position without accepting the call and then to a fully open position to accept the call after the caller ID information has been previewed. In another embodiment, the phone delays accepting the incoming call after the cover is opened to give the user time to preview the caller ID information and decide whether to answer the call.

8 Claims, 5 Drawing Sheets

//CALLER ID PREVIEW FOR MOBILE TELEPHONES

FIELD OF THE INVENTION

The present invention relates, in general, to mobile telephones used in wireless communications systems, and, in particular, to mobile telephones having caller ID and automatic answering features.

BACKGROUND OF THE INVENTION

A popular feature among users of mobile telephones is caller ID. This feature allows the user to view the number of the calling party prior to answering the phone. Caller ID information is extracted from the received signal and output to the phone's display. The user can view the caller ID information on the display of the telephone before answering and elect whether to answer the phone after observing the number of the calling party.

Another popular feature of mobile telephones is a flip cover or other type of movable cover. A flip cover is a cover that is connected by a hinge to the main body of the telephone. The flip or cover is moveable between open and closed positions. When the phone is not in use, the cover is folded against the main body of the telephone in the closed position. During use, the cover is moved to the open position to provide a hand-held telephone capable of providing a speaker proximate a user's ear and a microphone substantially near the user's mouth. Typically, the phone is programmed to automatically accept the incoming call when the cover or flip is moved to the open position after an incoming call is received.

Flip phones and other phones with moveable covers are sometimes designed so that the moveable cover conceals the display and keypad when the cover is in the closed position. Movable covers that conceal the display of the phone in the closed position prevent the user from taking advantage of the caller ID capability if the telephone is programmed to accept incoming calls when the cover is moved to the open position. There is no way the user can check the caller ID information before answering the call without triggering the automatic accept response of the phone. One solution to this problem is to disable the automatic accept response of the mobile telephone. However, this would require the user to take some affirmative step, in addition to opening the cover, in order to answer the phone and is therefore not desirable. Thus, there is a need for mobile telephone with a moveable cover that allows the user to view caller ID information on the display before answering an incoming call.

SUMMARY OF THE INVENTION

The present invention provides a mobile telephone with a moveable cover that conceals at least a portion of the display providing caller ID information associated with an incoming call. In one embodiment of the invention, the cover of the phone is moveable between a closed position, a preview position, and an open position. In the preview position, the user can preview the caller ID information on the telephone's display without accepting the incoming call. The user can then elect whether to accept the call. The call can be accepted by simply moving the cover to the open position, or not accepted by closing the cover. The phone can also be programmed to take some predefined action, such as a sending a busy signal, connecting the caller to voice mail, forwarding the call to another number, or simply not answering when the cover is closed.

In a second embodiment, the cover is moveable between two positions—open and closed. The automatic answer feature of the phone is not activated immediately when the cover is opened. Instead the phone waits a predetermined period of time before accepting the incoming call. Thus, the telephone gives the user an allotted amount of time, referred to as the preview period, to view the caller ID information and decide whether to answer the call. If the cover is returned to its closed position before the end of the preview period, the call is not accepted by the phone. The phone could be programmed to take some predetermined action if the cover is closed during the preview period, such as sending a busy signal, connecting the caller to voice mail, forwarding the call to another number. If the phone remains open, the incoming call is automatically accepted by the phone after the preview period expires. During the preview period, the user can also activate a pre-programmed response by actuating a function key on the phone's keypad.

These and other aspects of the present invention will become apparent to those skilled in the art after reading the following description of the preferred embodiments when considered with the drawings.

BRIEF DESCRIPTION OF THE DRAWING FIGURES

DETAILED DESCRIPTION OF THE PREFERRED EMBODIMENTS

Figure 1:
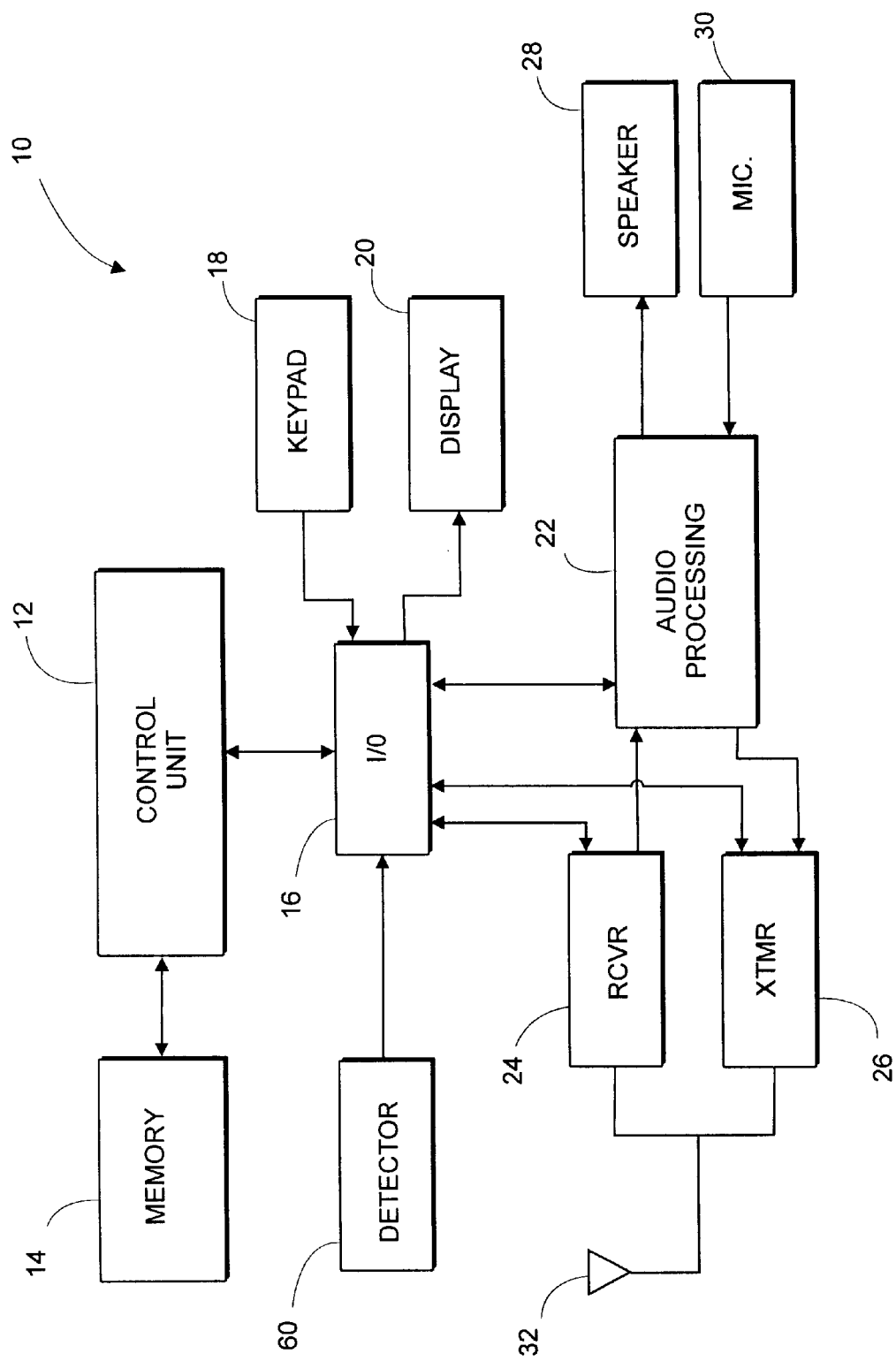
FIG. 1 is a functional block diagram of a mobile telephone with caller ID capability.

In the following description, like reference characters designate like or corresponding parts throughout the several figures. It should be understood that the illustrations are for the purpose of describing preferred embodiments of the invention and are not intended to limit the invention thereto.

FIG. 1 illustrates in block diagram form the main components of a mobile telephone 10 having caller ID capability. Mobile telephone 10 is a fully functional transceiver capable of transmitting and receiving digital signals over an RF channel. The disclosed embodiment operates according to known industry standards, such as Telecommuncations Industry Association (TIA) IS-136, which is incorporated herein by reference. The present invention, however, is not limited to digital phones, but may also be implemented in analog phones or other types of communication devices, both digital and analog.

The mobile telephone 10 includes a control unit 12, such as a microprocessor, for controlling the operation of the mobile telephone 10 and a program memory 14 for storing programs and data used by the mobile telephone 10. Input/output circuits 16 interface the control unit 12 with a keypad 18, display 20, audio processing circuits 22, receiver 24, and transmitter 26. The audio processing circuits 22 provide basic analog audio outputs to the speaker 28 and accept analog audio inputs from the microphone 30. An antenna 32 connected to the transmitter 24 and receiver 26 allows two-way, fully duplex communication over an RF channel.

Figure 2:
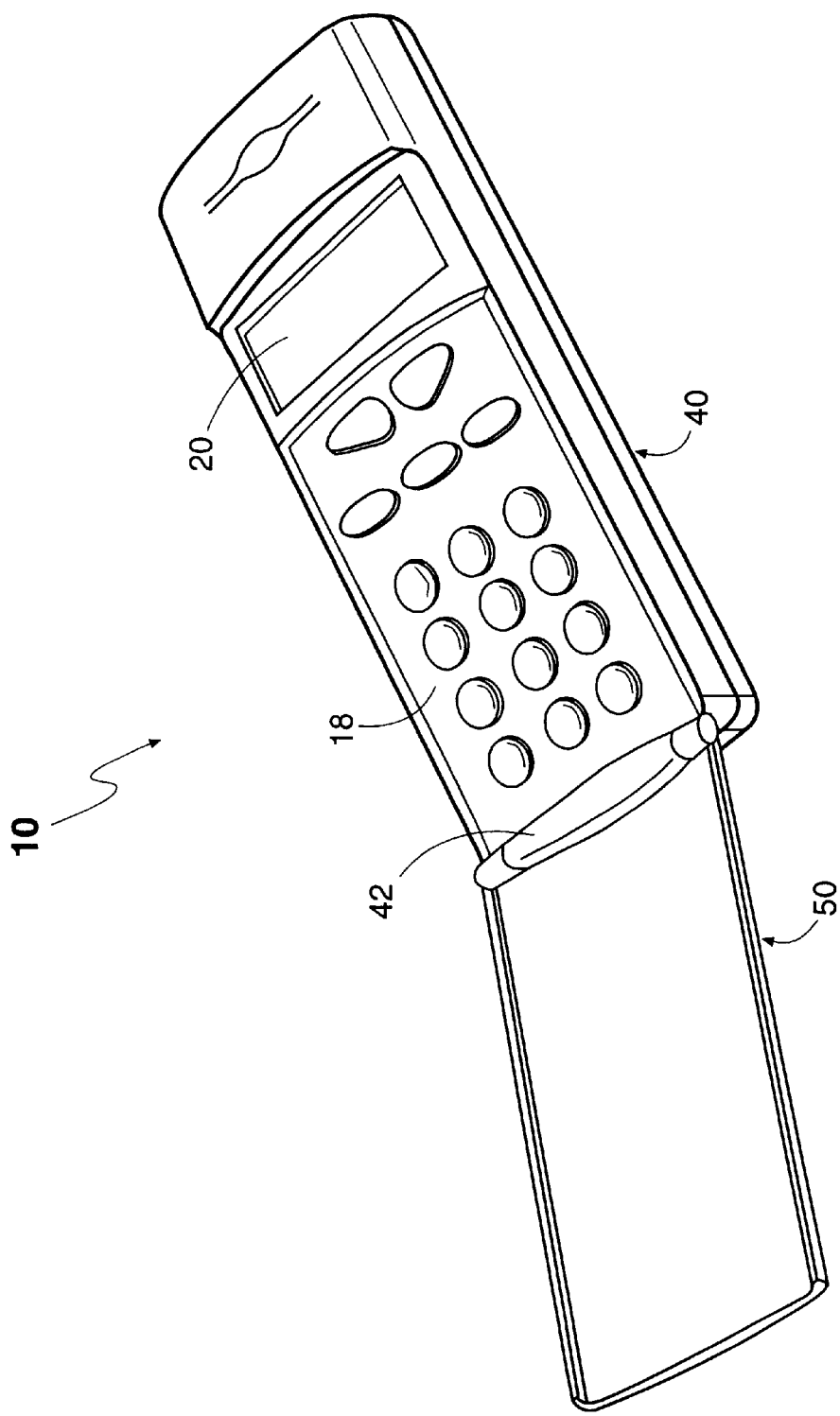
FIG. 2 is a perspective view of the mobile telephone with a moveable cover that conceals the display in the closed position.

FIG. 2 shows a perspective view of the mobile telephone 10. The mobile telephone 10 includes a main housing 40 and a movable cover 50. In the disclosed embodiment, the cover 50 is pivotally connected to the main housing 40 by a hinge 42 in a conventional manner. This type of cover 50 is commonly known as a flip cover 50. However, other forms of movable covers 50 are known, such as a sliding cover. While the disclosed invention uses a flip-type cover as an example, it should be apparent to those skilled in the art that the invention can also be implemented in phones with sliding covers or other types of movable covers.

Figure 3:
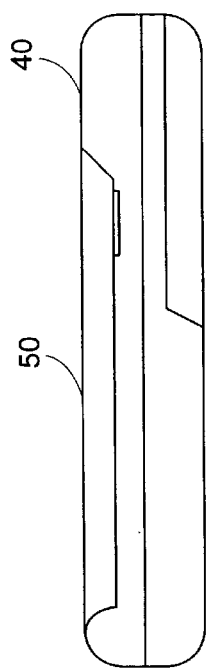
FIG. 3 is a side view of the mobile telephone with the movable cover in a closed position.
Figure 4:
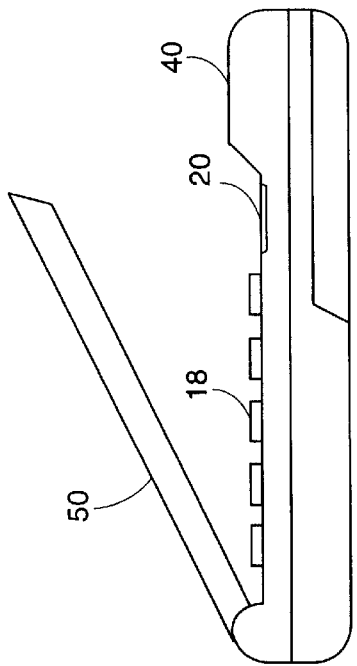
FIG. 4 is a side view of the mobile telephone with the movable cover in a preview position.
Figure 5:
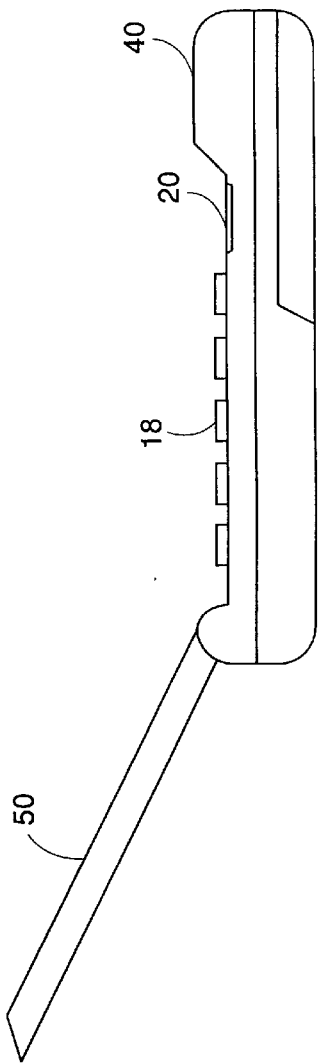
FIG. 5 is a side view of the mobile telephone with the movable cover in an open position.

The cover 50 pivots about hinge 42 between closed and open positions as shown in FIGS. 3–5. The main housing 40 contains the keypad 18, display 20, speaker 28, battery, and antenna 32. The microphone 30 is contained in the movable cover 50 in the disclosed embodiment. Those skilled in the art will recognize, however, that the particular distribution of components between the main body 40 and movable cover 50 is not a material aspect of the invention, and other arrangements of the components are possible. For example, the display 20 or keypad 18 could be placed on the cover 50.

When the movable cover 50 is in the closed position, the cover 50 conceals the display 20. Thus, when an incoming call is received by the telephone 10, the user must open the cover 50 at least partially in order to view caller ID information on the display 20. In prior art telephones, opening the cover 50 after an incoming call is received would cause the telephone 10 to automatically accept the call. The present invention allows the cover 50 to be opened at least partially to allow viewing of caller ID information on the display 20 without triggering the automatic accept response of the telephone 10.

In one embodiment of the invention, the movable cover 50 can be partially opened to a preview position to allow the user to see caller ID information on the display 20 without triggering the automatic accept response of the telephone 10. As shown in FIGS. 3–5, the movable cover 50 has at least three positions that are referred to herein as the closed position (FIG. 3), the open position (FIG. 5), and the preview position (FIG. 4). One or more position detectors 60 enable the telephone 10 to determine the position of the movable cover 50. The position detectors 60 are operatively connected to the control unit 12, which uses signals from the position detectors 60 to determine the position of the cover 50. The position detectors 60 may comprise mechanical switches actuated by the movement of the cover 50, a series of contacts engaged by the cover 50 in each position, or position sensors to detect the position of the cover 50. Virtually any type of position sensor can be used including without limitation a Hall Effects sensor, magnetic sensor, or optical sensor. In the preferred embodiment of the invention, the position detectors 60 allow the telephone 10 to discriminate between three positions: the closed, open and preview positions. However, those skilled in the art will recognize that it is not necessary to detect the cover 50 in all three positions. All that is required is that the telephone 10 be able to detect the cover 50 when it moves beyond the preview position. Also, the number of position detectors 60 used is not material. The present invention can be implemented with a single position detector 60 to monitor one or more positions, or with individual position detectors 60 to monitor each position.

Normally, the movable cover 50 is in the closed position when an incoming call is received. In prior art telephones, the user moves the cover 50 to the open position to answer the call triggering the automatic accept response of the telephone 10. In the present invention, the cover 50 can be opened partially to the preview position allowing the user to view caller ID information on the display 20 without triggering the automatic accept response of the telephone 10. If the user wants to answer the incoming call, the user moves the cover 50 to the open position which, like prior art phones, triggers the automatic accept response. On the other hand, if the user does not want to answer the incoming call, the user simply moves the cover 50 back to the closed position. In this later case, the telephone 10 may simply continue ringing and wait for the user to answer until the incoming call terminates. Alternatively, the telephone 10 could respond affirmatively to the closing of the cover 50 by generating a busy signal, by connecting the caller to a voice mailbox, or by forwarding the call to another number.

Many variations of this embodiment are possible. In one variation, the cover 50 is detected by the position detector 60 when the cover is moved to the open position. A trigger point is selected to allow partial opening of the cover 50 to a preview position without triggering the automatic accept response of the telephone 10. The trigger point is reached or passed when the cover 50 is moved to the open position. When an incoming call is received, the user lifts the cover 50 partially to the preview position to view caller ID information on the display 20. If the user does not want to answer the call, the user simply closes the cover 50. Since the cover 50 does not reach the trigger point, the call is not accepted. In this case, the telephone 10 will simply ignore the incoming call, or may connect the caller to a voice mailbox after a predetermined time period if the phone 10 is equipped with voice mail capability. If the user wants to answer the call, the cover 50 is moved to the open position triggering the automatic accept response. In this embodiment, it is not necessary to detect the cover 50 in the closed position of the preview position.

A variation of the first embodiment detects the cover 50 in the open and closed positions. As in the previous variation, the user moves the cover 50 to the preview position when an incoming call is received to view the caller ID information. If the user wants to answer the call, the user moves the cover 50 to the open position. If not, the user closes the cover 50. In this variation, the telephone 10 is able to discriminate between the open, closed, and preview positions. The telephone 10 can be programmed to take some predetermined action if the cover 50 is sequentially moved to the preview position and then closed after an incoming call is received. For example, the telephone 10 could be programmed to respond affirmatively to the closing of the cover 50 by generating a busy signal, rejecting the incoming call, connecting the caller to a voice mailbox, or forwarding the call to another number.

Figure 6:
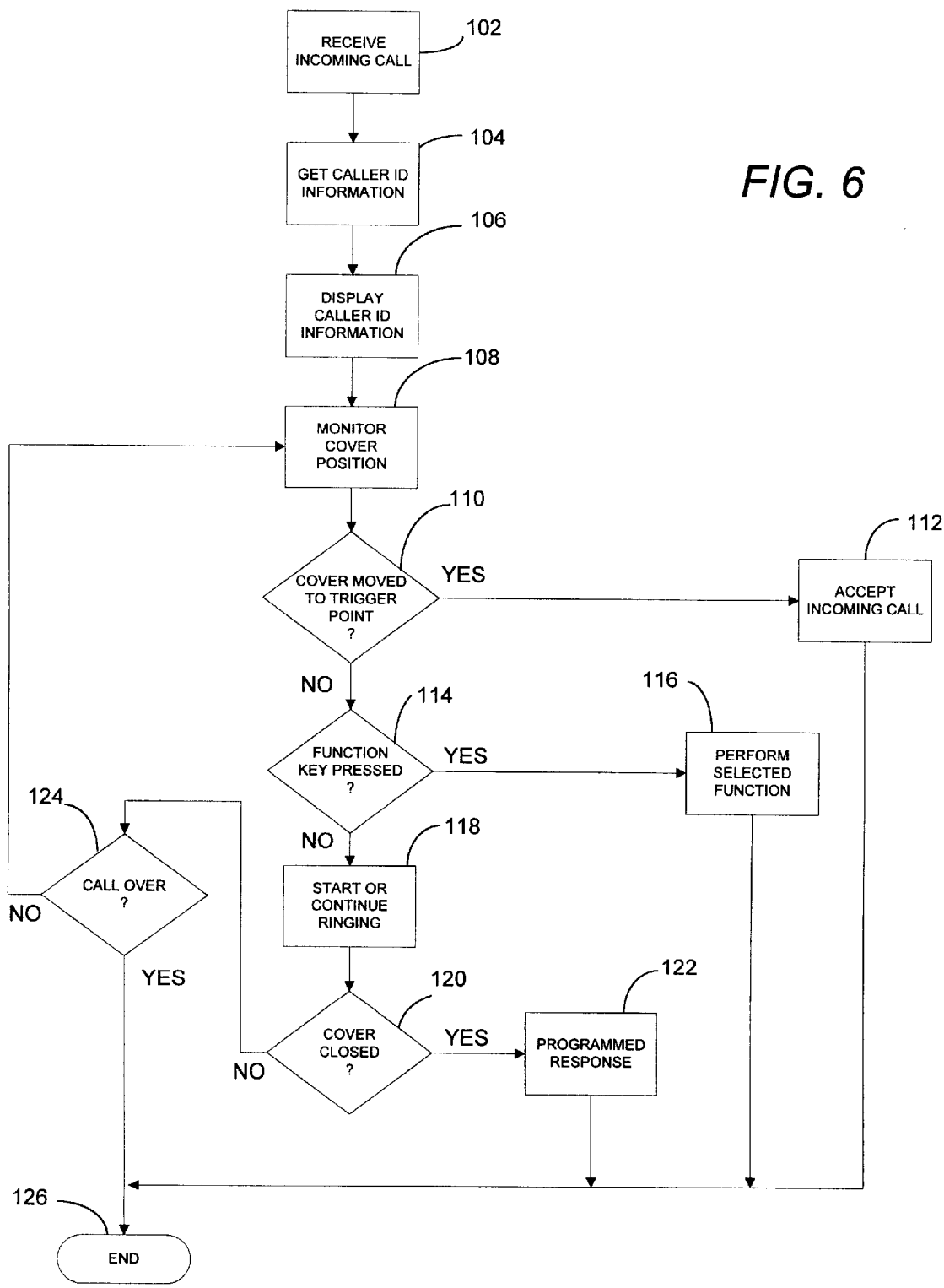
FIG. 6 is a flow chart illustrating a call answer procedure according to a first embodiment of the present invention.

FIG. 6 is a flow diagram illustrating one possible implementation of a call answering procedure according to the present invention. When the incoming call is received (block 102), the phone 10 extracts caller ID information from the incoming call (block 104) and displays the caller ID information on the display 20 (block 106). The phone 10 then begins to monitor the position of the cover 50 (block 108). If the cover 50 is moved to the the open position, the phone will detect the cover 50 as it passes the trigger point (block 110) and accept the incoming call (block 112). If the cover 50 is opened to the preview position, the cover 50 does not reach the trigger point and the phone 10 does not accept the call. While the cover 50 is in the preview position, the user may press a designated function key to activate a pre-programmed response, such as sending a busy signal, connecting the caller to a voice mailbox, or forwarding the call to another number. The phone detects the pressing of a designated function key (block 114) and takes the appropriate action depending on the key that is pressed (block 116). Activation of one of the function keys by the user is regarded by the phone 10 as a rejection of the incoming call. In embodiments that detect the cover 50 in the closed position, the phone could also be programmed to activate a reprogrammed response (block 122) when it detects that the cover 50 has been closed (block 120). If the cover 50 is not opened past the trigger point and the user has not activated a pre-programmed response, the phone 10 will continue ringing (block 118) until the incoming call terminates (block 124). If the call is accepted, rejected, or terminated the procedure ends (block 126).

In a second embodiment of the invention, the cover 50 has only two positions, open and closed. In this embodiment, the phone 10 allows a predetermined period of time to view caller ID information before activating the automatic accept response of the mobile telephone 10. When the cover 50 is opened, a preview timer is started. When the preview period is over, the incoming call is automatically answered if the cover 50 is not closed before the end of the preview period. If the cover 50 is closed before the preview period expires, the phone 10 does not accept the call. As in the previous embodiments, the phone 10 can be programmed to respond to activation of a function key by the user to send a busy signal, to connect the caller to a voice mailbox, or to forward the call to another number when the phone 10 is not answered. One of these programmed responses could also be activated when the cover 50 is closed before the end of the preview period.

Figure 7:
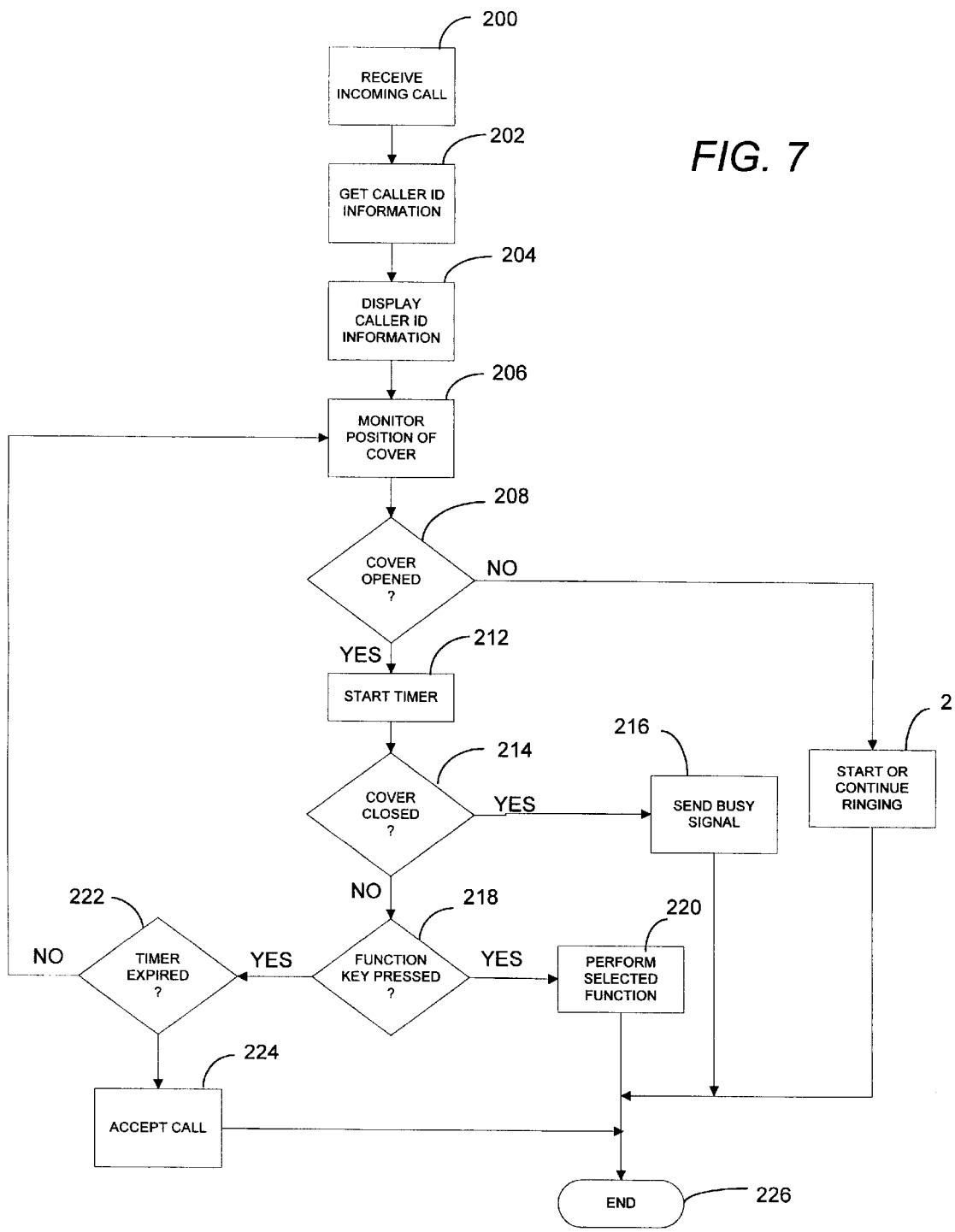
FIG. 7 is a flow chart illustrating a call answer procedure according to a second embodiment of the present invention.

The flow chart of FIG. 7 outlines the procedure for providing caller ID preview during a select period of time. The process begins when an incoming call is received (block 200). Telephone 10 will determine caller ID information from the incoming call (block 202) and display the caller ID information on the telephone's display 20 (block 204). During the call, the control system 12 will monitor the position of the cover 50 with respect to the main housing (block 206). If the cover 50 is not opened (block 208), the phone 10 continues ringing and waits for the user to answer (block 210). If the cover 50 is opened, a preview timer is activated (block 212). During the ensuing preview period, the phone 10 will monitor the position of the cover 50. If the cover 50 is closed during the preview period, it will be detected by the phone 10 (block 214) and the phone 10 will reject the incoming call by sending a busy signal (block 216) and the process ends (block 226). Alternatively, the phone 10 could be programmed to take some other action, such as connecting the user to a voice mailbox or forwarding the call to another number when the cover 50 is closed. If the cover 50 is still open when the preview timer expires ending the preview period (block 222), the phone 10 accepts the incoming call (block 224) and the procedure ends (block 226). As in the previous embodiments, the phone 10 may detect the actuation of a function key (block 118) and take the appropriate action depending on the key pressed (block 220). One function key could be assigned to manually answer the call before the end of the preview period so that the user does not have to wait until the preview period expires to answer the call. Other functions may include sending a busy signal, connecting the caller to a voice mailbox, or forwarding the call to another number.

In each of the embodiments described, the phone 10 may be configured to respond to the actuation of a key by the user while the cover 50 is in the preview position or the open position. For example, the phone can be programmed to send a busy signal or to redirect the call to a voice mailbox in response to actuation of a particular key or key sequence. Also, the phone could be programmed to display a list of options on the display (e.g. send busy signal, send to voce mail, etc) so that the user does not have to recall the particular key or key sequence.

Certain modifications and improvements will occur to those skilled in the art upon reading the foregoing description. It should be understood that all such modifications and improvements have been omitted for the sake of conciseness and readability, but are properly within the scope of the following claims.

I claim:

1. A communication terminal comprising:
   a. a housing;
   b. a display on said housing for displaying caller ID information;
   c. a cover mounted to said housing for movement between a first position in which said display is obstructed from view by said cover, a second position for previewing caller ID information on said display, and a third position for answering incoming calls;
   d. control logic responsive to both movement of said cover from said first position to said second position after an incoming call is received to allow previewing of said caller ID information on said display without accepting said incoming call, and movement of said cover to said third position after an incoming call is received to accept said incoming call.

2. The communication terminal according to claim 1 wherein said control logic is responsive to further movement of said cover from said second position to said first position after an incoming call is received to reject said incoming call.

3. The communication terminal according to claim 1 wherein said control logic is responsive to further movement of said cover from said second position to said first position after an incoming call is received to generate a busy signal.

4. The communication terminal according to claim 1 wherein said control logic is responsive to further movement of said cover from said second position to said first position after an incoming call is received to redirect said incoming call.

5. The communication terminal according to claim 1 further including a keypad having one or more function keys, and wherein said control logic is responsive to actuation of a function key following receipt of an incoming call to take a predetermined action.

6. The communication terminal according to claim 5 wherein said control logic generates a busy signal in response to actuation of said function key.

7. The communications terminal according to claim 5 wherein said control logic connects the caller to a recording device in response to actuation of said function key.

8. The communication terminal according to claim 5 wherein said control logic redirects said incoming call in response to actuation of said function key.

* * * * *